US011014039B2

(12) United States Patent
Kelly et al.

(10) Patent No.: US 11,014,039 B2
(45) Date of Patent: May 25, 2021

(54) NITROGEN SERVICE SUPPLY SYSTEM

(71) Applicants: Richard M Kelly, East Amherst, NY (US); Mahesh Biradar, Tonawanda, NY (US); Matthew J Thomas, Spring, TX (US); George Cieutat, Spring, TX (US)

(72) Inventors: Richard M Kelly, East Amherst, NY (US); Mahesh Biradar, Tonawanda, NY (US); Matthew J Thomas, Spring, TX (US); George Cieutat, Spring, TX (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 168 days.

(21) Appl. No.: 16/029,004

(22) Filed: Jul. 6, 2018

(65) Prior Publication Data

US 2020/0009493 A1    Jan. 9, 2020

(51) Int. Cl.
*B01D 53/047*      (2006.01)
*C01B 21/04*       (2006.01)
*F25B 19/00*       (2006.01)
*F24F 5/00*        (2006.01)

(52) U.S. Cl.
CPC ........ *B01D 53/047* (2013.01); *C01B 21/0461* (2013.01); *F25B 19/005* (2013.01); *B01D 2253/102* (2013.01); *B01D 2253/116* (2013.01); *B01D 2256/10* (2013.01); *B01D 2257/104* (2013.01); *B01D 2259/455* (2013.01); *C01B 2210/0045* (2013.01); *F24F 5/0035* (2013.01)

(58) Field of Classification Search
CPC .............. B01D 53/0407; B01D 53/047; B01D 2253/102; B01D 2253/116; B01D 2256/10; B01D 2257/104; B01D 2259/455; C01B 21/0461; C01B 2210/0045; F24F 5/0035; F25B 19/005
USPC ........ 95/130, 139, 96; 96/108, 121; 62/53.2; 423/351, 406
See application file for complete search history.

(56) References Cited

U.S. PATENT DOCUMENTS

| 5,759,214 A | * | 6/1998 | Ohmi ........................ F25J 3/044 29/25.01 |
| 5,865,206 A | * | 2/1999 | Steigman ................... F17C 7/04 137/7 |
| 5,987,918 A | * | 11/1999 | Brooks ................ B01D 53/047 62/643 |
| 6,443,245 B2 | | 9/2002 | Michael |

(Continued)

FOREIGN PATENT DOCUMENTS

| CN | 1296858 A | 5/2001 |
| CN | 103539084 A | 1/2014 |

(Continued)

OTHER PUBLICATIONS

Parker Balston, Nitrogen Generation Systems Bulletin N2-R, Dec. 31, 2015, XP055619094, pp. 1-22.

(Continued)

*Primary Examiner* — Frank M Lawrence, Jr.
(74) *Attorney, Agent, or Firm* — Iurie A. Schwartz

(57) ABSTRACT

The present invention relates to a novel integrated system for providing nitrogen (N2) to a variety of industrial service applications such as, for example, process unit drying, pipeline purging, reactor cooling, vessel inerting, pipeline displacement.

12 Claims, 1 Drawing Sheet

Mobile N₂ PSA and Liquid N₂ Fed System to Supply a Nitrogen Service Application

(56) References Cited

U.S. PATENT DOCUMENTS

| | | |
|---|---|---|
| 7,124,833 B2 | 10/2006 | Sant'Angelo |
| 7,497,894 B2 | 3/2009 | Jeffers et al. |
| 7,588,612 B2 | 9/2009 | Marwitz et al. |
| 8,069,668 B2 | 12/2011 | Haggerty et al. |
| 2004/0050095 A1* | 3/2004 | Brigham ............... F25J 3/04254 62/643 |
| 2007/0151454 A1 | 7/2007 | Marwitz et al. |

FOREIGN PATENT DOCUMENTS

| | | |
|---|---|---|
| CN | 203768028 U | 8/2014 |
| EP | 0512780 A1 | 11/1992 |
| GB | 2274407 A | 7/1994 |
| JP | H07183040 A | 7/1995 |

OTHER PUBLICATIONS https://www.oxymat.com/products/psa-nitrogen-generators/oxymat-x-series-frame-built-solutions. Oxymat X-Series Frame Built Solutions—PSA nitrogen Generators, Oxymat A/S 2017, (, Headquarter, Production, R&D, Sales and Service) Helsinge, Denmark.
https://aglonsite.com/products/gas-products/nitrogen-generation/portable-nitrogen-generators/; AGL On-Site Solutions Inc. Head Office, Surrey, British Columbia, 2013-2018.

\* cited by examiner

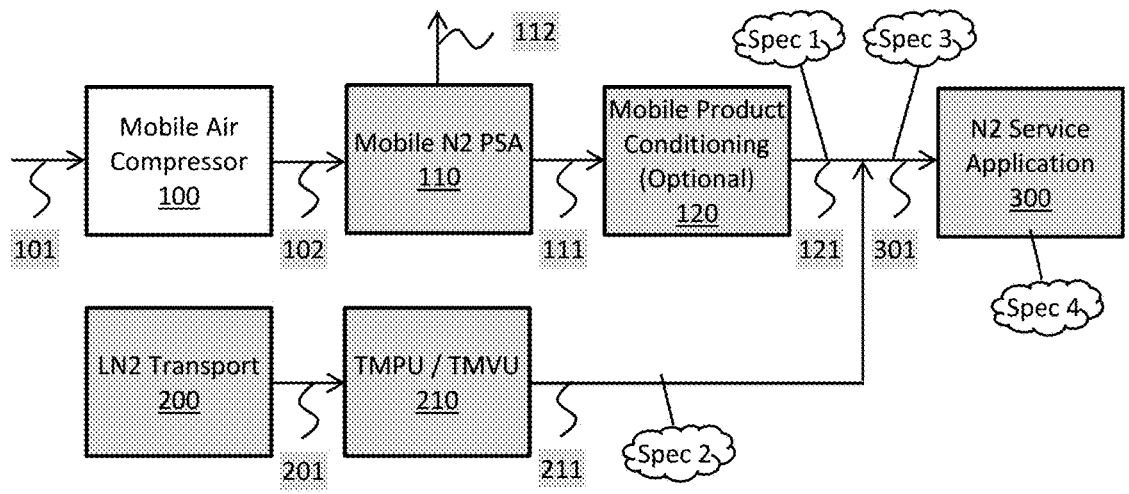
Mobile N₂ PSA and Liquid N₂ Fed System to Supply a Nitrogen Service Application

NITROGEN SERVICE SUPPLY SYSTEM

FIELD OF INVENTION

The present invention relates to a system for providing nitrogen (N2) to a variety of industrial service applications such as, for example, process unit drying, pipeline purging, reactor cooling, vessel inerting, pipeline displacement etc. These service applications require $N_2$ for a short period of time ranging anywhere from a single day to several weeks (up to 90 days), each application with different flow, pressure, temperature and purity requirements.

BACKGROUND OF THE INVENTION

Common sources of temporary $N_2$ supply include: liquid $N_2$-fed trailer mounted pumper units (TMPUs) and trailer mounted vaporizer units (TMVUs), compressed $N_2$ tube trailers, as well as mobile $N_2$ membrane generation units. Local, permanently installed sources of $N_2$ can also be considered. However, these generally cannot supply the service application needs, in addition to their normal permanent demand and may have a supply pressure or temperature mismatch.

$N_2$ from liquid $N_2$ sources is generally considered high purity at approximately 99.999% purity, and $N_2$ from liquid $N_2$-fed TMPUs and TMVUs can be supplied over a range of pressures and temperatures by virtue of the pressure pumping and pressure building capabilities and the onboard heaters and vaporizers, respectively. However, liquid $N_2$ deliveries can be costly, especially over long distances and require availability of transports/tractor trailers to maintain supply. In addition, service provider TMPUs and TMVUs can be tied up for several weeks and unavailable for competing applications. $N_2$ tube trailers, on the other hand, can supply high purity and pressure but have limited capacity and, therefore, usefulness. Mobile $N_2$ membrane generators overcome some of these limitations but can be limited in $N_2$ capacity especially when operated at higher purity requirements, where $N_2$ recovery is significantly reduced. Capabilities of common temporary $N_2$ supply systems are shown, below, in Table 1.

TABLE 1

Common Temporary Nitrogen Supply Systems

| Nitrogen Supply System | Flow Rate (kscfh) | Supply Pressure (psig) | Supply Temperature (° F.) | Storage Capacity (kscf) |
|---|---|---|---|---|
| Trailer Mounted Pumper Unit (TMPU) | Up to 540 | Up to 10,000 | −320 to +600 | 180 |
| Trailer Mounted Vaporizer Unit (TMVU) | Up to 100 | Up to 300 | −320 to +120 | 300 |
| Tube Trailers | Up to 20 | Up to 2,600 | Ambient | 60-120 |
| Transports/ Tractor Trailer | N/A | N/A | N/A | 500 |

In addition, several other systems have been proposed in the related art to handle the nitrogen supply for short term applications. For instance, U.S. Pat. No. 6,443,245 to Michael describes a method for servicing gas or oil wells with a nitrogen rich gas that is generated by a membrane or pressure swing adsorption (PSA) system, purportedly as a less expensive and more reliable alternative to conventional systems using cryogenic nitrogen. An example is provided where a typical drilling operation requiring 90 to 180 kscfh nitrogen having no more than 5 to 8% oxygen, is delivered at 1,500 to 2,000 psig through a booster compressor. The average service duration is reported as 5 days to 2 weeks. However, Michael does not describe the capacity capability of the membrane or PSA systems and does not discuss their sizing relative to the service application requirements, nor the equipment utilization thereof. Furthermore, Michael does not contemplate the dual use of an $N_2$ generator with a conventional mobile supply system utilizing cryogenic $N_2$ (i.e., a liquid N2 fed supply system).

One the website https://aglonsite.com/products/gas-products/nitrogen-generation/portable-nitrogen-generators/, AGL On-site solutions describes a mobile $N_2$ PSA system that is capable of supplying $N_2$ gas at up to 90 kscfh and at purities up to 99.99995%, that is flexible for remote or stationary applications. This disclosure, however, does not contemplate the dual use of the mobile $N_2$ PSA with a conventional mobile system supply utilizing cryogenic $N_2$.

It is well known in the art for permanent or semi-permanent $N_2$ supply systems, to install an on-site $N_2$ generation means that is sized to the customer's $N_2$ demand requirements. Typically, a liquid $N_2$ tank and vaporization system is also installed to supply supplemental $N_2$ in times of peak demand, and back-up $N_2$ in the event that the generation means fails. The on-site generation means can be a membrane, PSA, cryogenic or other $N_2$ producing plant. Japanese Patent Publication No. 7183040A describes such a $N_2$ PSA and liquid $N_2$ supply system for a fuel cell power generating system. Chinese Patent Publication No. 103539084A also describes a $N_2$ PSA and liquid $N_2$ supply system to feed a vulcanizing machine. Great Britain Patent No. 2274407B to Dennis describes another such system where the waste refrigeration from the liquid $N_2$ supply system is used to cool and thereby densify the feed air being compressed into the PSA. This increases the $N_2$ generation capacity and reduces the amount of liquid $N_2$ required to supply the customer needs.

While mobile $N_2$ PSA units present a capacity improvement over their membrane counterparts in part due to higher $N_2$ recovery factors, particularly at higher purities, they are still unable to supply the capacity demands of many service applications. Further, they are incapable of supplying hot, cold, high pressure or high purity nitrogen without additional product conditioning/processing (i.e., a heating, chilling, compression, or purification).

None of these related art solutions contemplate mobilization of a PSA generator and liquid $N_2$ fed supply system for temporary $N_2$ supply to varying service applications.

Thus, to overcome the disadvantages of the related art, it is an object of the invention to provide a mobile nitrogen supply system having a mobile PSA generator to supply a base load of nitrogen for a variety of industrial service applications.

It is another object of the invention, to provide mobilization of a PSA generator and liquid $N_2$ supply system for temporary $N_2$ supply to varying service applications.

Other objects and aspects of the present invention will become apparent to one skilled in the art upon review of the specification, drawings and claims appended hereto.

SUMMARY OF THE INVENTION

This invention relates to a mobile nitrogen generation system to supply a variety of temporary industrial service applications such as, for example, process unit drying, pipeline purging, reactor cooling, vessel inerting and pipeline displacement.

In one aspect of the invention, an integrated system for providing nitrogen to a temporary industrial service application is provided, including:

at least one mobile pressure swing adsorption unit for providing a baseload of nitrogen fluid having a first specification to a nitrogen service application;

at least one mobile liquid $N_2$ fed system for providing supplemental nitrogen at a second specification to the nitrogen service application, wherein the combined baseload and supplemental nitrogen provide a product nitrogen stream at a predetermined flow rate, temperature, pressure, and purity as required by the industrial service application.

In another aspect of the invention, an integrated process for providing nitrogen to a temporary industrial service application is provided. The process includes:

providing a compressed feed stream to at least one mobile nitrogen pressure swing adsorption unit and separating a baseload of nitrogen fluid having a first specification from an oxygen enriched waste steam;

providing a supplemental nitrogen via a liquid $N_2$ fed system wherein the supplemental nitrogen is provided at a second specification, and combining the supplemental nitrogen with the baseload nitrogen fluid producing a product nitrogen stream at a predetermined flow rate, temperature, pressure and purity as required by the industrial service application.

In yet another aspect of the invention, an integrated process for providing nitrogen to a temporary cooling service application is provided. The process includes:

providing a compressed air feed stream to at least one mobile nitrogen pressure swing adsorption unit and separating a baseload of nitrogen fluid having a first specification from an oxygen enriched waste steam and where said baseload nitrogen fluid is at a higher temperature than required by the cooling application;

providing a supplemental nitrogen via a liquid $N_2$ fed system wherein the supplemental nitrogen is provided at a second specification and where the supplemental nitrogen is at a lower temperature than required by the cooling application and combining the supplemental nitrogen with the baseload nitrogen fluid producing a product nitrogen stream at a predetermined flow rate, temperature, pressure and purity as required by the cooling service application.

In a further embodiment, an integrated process for providing nitrogen to a temporary industrial service application is provided. The process includes:

providing a compressed air feed stream to at least one mobile nitrogen pressure swing adsorption unit and separating a baseload of nitrogen fluid having a first specification from an oxygen enriched waste steam and where said baseload nitrogen fluid is at a lower purity than required by the service application;

providing a supplemental nitrogen via a liquid $N_2$ fed system wherein the supplemental nitrogen is provided at a second specification and where the supplemental nitrogen is at a higher purity than required by the service application and combining the supplemental nitrogen with the baseload nitrogen fluid producing a product nitrogen stream at a predetermined flow rate, temperature, pressure and purity as required by the service application.

BRIEF DESCRIPTION OF THE DRAWING

The above and other aspects, features, and advantages of the present invention will be more apparent from the following drawing, wherein:

FIG. 1 is a depiction of a schematic illustration of the nitrogen supply system of the of the present invention.

DETAILED DESCRIPTION OF THE INVENTION

The present invention provides a mobile nitrogen supply system for servicing a number of industrial applications, all of which are temporary in nature varying from a few days to several weeks and have different specification requirements. Typical service application and the nitrogen requirement for which the system of the present invention is applicable is detailed in Table 2, below.

TABLE 2

Typical Service Applications and Nitrogen Requirements

| Service Application | Flow Rate (kscfh) | Pressure (psig) | Temp. (° F.) | Purity (vol %) | Duration (days) |
|---|---|---|---|---|---|
| Process Unit Drying | 50-1,000 | 100 | <150 | 90-99.5 | 15-45 |
| Transmission Pipeline Drying/Purging | 50-100 | 50 | Ambient | 95-99 | 5-15 |
| Inert Support for Catalyst Replacement | 20-60 | 100 | <100 | 99-99.5 | 3-21 |
| Accelerated Process Reactor Cooling | 40-400 | 300 | −320-320 | 99-99.5 | 1-5 |
| Storage Tank Cooling/Purging | 40-140 | >50 | −250-50 | 95-99.5 | 3-10 |
| Heating and Stripping | 40-250 | 150 | >150 | 95-99.5 | 3-10 |
| Once Through Reactor Cooling | 25-400 | 150 | 50-250 | 95-99.5 | 1-10 |
| Transmission Pipeline Displacement | 25-400 | 50-500 | Ambient | 90-99 | 1-3 |
| Pipeline Target Testing | 25-200 | 100 | Ambient | 90-95 | 1-3 |
| Mine Inerting | >100 | 100 | Ambient | 95-99.5 | 10-50 |

The following is a brief description of these applications: (i) process unit drying is required for plants and unit operations that are sensitive to moisture during operation, for example moisture needs to be removed from Liquefied Natural Gas (LNG) plants prior to commissioning to avoid moisture freezing in lines and equipment; (ii) transmission pipeline drying/purging is required for natural gas pipelines and the likes to remove oxygen and moisture which might cause purity, ignition and corrosion issues when natural gas is introduced into the line. Additionally, lines need to be purged to remove natural gas prior to decommissioning; (iii) inert support for catalyst replacement is required in reactors where pyrophoric or reactive catalyst is to be manually replaced. Oxygen is generally required less than 5% before this work can be carried out; (iv) accelerated process reactor cooling is required prior to catalyst change out or reactor maintenance, where it is desired to more quickly cool the reactor from operating or elevated temperature to a temperature where work can be safely performed. Generally, cold or cryogenic nitrogen is added to a recirculating gas stream to remove heat; (v) storage tank cooling and purging is required to lower the temperature of tanks, for example LNG tanks, prior to being filled with product. This purges impurities and lowers thermal shock and boil off/flashing during product filling; (vi) heating and stripping is used for unit operations, tanks and pipes that contain liquid contaminants that need to vaporized to be removed. It can also be used to accelerate process unit drying; (vii) once-through reactor cooling is used for reactors and vessels that have no recirculation stream, hence nitrogen gas in flowed "once through" to remove heat; (viii) transmission pipeline displacement is generally used to remove liquids from a pipeline prior to maintenance or change of service. A pig may be used to seal between the nitrogen gas and liquid being displaced; (ix) pipeline target testing is a term generally used to describe flushing of particulates or debris from a pipeline that will feed a critical or sensitive piece of machinery that may be damaged, for example a gas turbine, (x) mine inerting is required to extinguish or prevent mine fires or explosions, where oxygen is displaced to prevent combustion processes from occurring. Whilst this is not a comprehensive list of service applications, it represents some of the more common jobs encountered in the nitrogen service industry.

With reference to Table 2, the nitrogen required in the industrial service sector depends on the applications. The demands of the customer can range from approximately 20 kscfh to 1,000 kscfh with nitrogen purities ranging from approximately 90% to 99.9%. The pressure and temperature required can also vary along with the duration required for the nitrogen service. The $N_2$ PSA provides a low cost means to generate nitrogen gas, but in many cases does not have the capability to meet all the specifications dictated by the customer application. By combining the $N_2$ PSA supply with $N_2$ supply from a liquid $N_2$ fed system, it is possible to increase the rate of supply, increase the purity of supply, and modify the temperature of supply, whilst maintaining a low cost $N_2$ supply. The temperature of supply can further be modified by addition of a portable heater to the $N_2$ PSA product. Further, the supply pressure from the $N_2$ PSA can be increased by addition of a portable product compressor in order to meet the needs of the service application. The inventive solution, therefore provides the ability to tune and range the nitrogen flowrate, purity, temperature, and pressure required to meet customer service needs with one integrated system. In the event that the at least one $N_2$ PSA system fails, the liquid $N_2$ (LIN) based supply system can provide the entire customer requirements and therefore provide reliability of supply. Additionally, all of the components in the supply system are mobile, either being on trailers, movable skids or motorized vehicles, for example. It is, therefore, possible to locate the equipment quickly at the customer site in a customized fashion to meet the specific needs of each customer.

By way of explanation, and as depicted in FIG. 1, an integrated nitrogen service supply system is provided with at least one mobile $N_2$ PSA in combination with at least one liquid $N_2$-fed trailer mounted pumping unit (TMPU) or trailer mounted vaporizer unit (TMVU).

The most common method used to supply nitrogen to meet the service application demand is through liquid $N_2$ fed sources such as TMPUs and TMVUs, referenced above. A TMVU comprises a cryogenic storage vessel containing cryogenic product in a liquid form that can be supplied at a specified temperature/phase and pressure within its operating limits. If the required temperature or pressure is above the fluids boiling point conditions (77° K at 0 psig and 117° K at 300 psig for liquid $N_2$) then onboard cryogenic vaporizers are utilized to add heat, or convert product from a liquid to a gas in order to build pressure. The pressure and temperature of the product is controlled by the flow of product to the vaporizers to meet/exceed the customer's specification. A TMPU (trailer mounted pumper unit), also holds product in a liquid state. However, in this case an onboard diesel engine provides power to a positive displacement pump via a gear box in order to raise the pressure. The pump supplies the product to the customer at a required flow rate and temperature/phase. If the required phase is vapor then a powered vaporizer is utilized to vaporize the product stream and heat it to the desired temperature. Various models have different vaporization methods but in general combustion of diesel fuel provides the heat for vaporization of the product. The range of specifications from such sources is provided in Table 1, above.

With reference back to FIG. 1, at least one mobile air compressor (100) compresses atmospheric air feed stream (101) to approximately 150 psig to form compressed air feed stream (102). As the air is compressed and cooled, some moisture is condensed out, separated and drained (not shown). Stream (102) is fed to the mobile $N_2$ PSA (110), to form a $N_2$ PSA product stream (111) and oxygen enriched waste stream (112). The PSA (pressure swing adsorption) apparatus separates specific gas species from a mixture of gases at elevated pressure using the principle of adsorption. The molecular characteristics for the species being separated and their affinity to an adsorbent material are critical to this process. In a $N_2$ PSA, feed air flows upwards through a molecular sieve adsorbent bed, typically carbon based, contained in a vertical vessel allowing oxygen and other impurities to be adsorbed until the volume of the adsorbent bed approaches saturation. A concentration gradient moves through the bed over time. When the concentration gradient is near the top, the vessel is depressurized and regenerated. A parallel bed is brought into service in the adsorption mode. Each vessel operates in a batch mode. However, a continuous flow of the $N_2$ product gas is maintained via multiple adsorbent beds synchronized and operating on a continuous timed cycle. While one bed is in the adsorption mode, the other is in the regeneration mode. Oxymat is a global supplier of $N_2$ PSA generators suitable for this application, and their web site https://www.oxymat.com/products/psa-nitrogen-generators/oxvmat-x-series-frame-built-solutions describes the X-series of frame built solutions, which include: buffer vessels, filters, advanced control, dew point, pressure, temperature, flow, purity and remote monitoring. An X5 for instance comprises five pairs of two bed PSAs operating in unison to produce up to 5,558 sm3/hr (~200 kscfh) of $N_2$ gas at 95% purity and 8 barg (116 psig) pressure, with capability of generating up to 99.9999% purity, albeit at lower capacity. Using the 2-bed system also permits pressure equalization, where the gas leaving the vessel being depressurized is used to partially pressurize the second vessel. This results in significant energy savings. The operation of the PSA system can be tuned to deliver a variety of nitrogen purities. The purity obtained is in inverse relation to the flowrates achievable. The preferred PSA design is where the PSA is sized to the maximum capacity possible to fit on a trailer within road weight and size limitations, and the feed air compressor is therefore placed on a separate portable trailer or skid. The performance characteristics of one such design are provided in table 3, below. Depending on the requirements of the service application supported by this system, it allows the use of a product compressor, chiller, heater, and purifier in any combination. This would allow the system to achieve a wider range of product pressure and temperature requirements.

TABLE 3

Example Capabilities of a Mobile Nitrogen PSA

| Purity (vol %) | Capacity (kscfh) | Air Required (kscfh) | Recovery Factor (%) |
|---|---|---|---|
| 99.5% | 73 | 240 | 31% |
| 99% | 100 | 300 | 35% |
| 95% | 135 | 300 | 47% |

Supply pressure = 120 psig, supply temperature = ambient plus about 20° F.

With reference back to FIG. 1, stream (112) includes oxygen, argon, unrecovered $N_2$ and atmospheric contaminants such as moisture and carbon dioxide ($CO_2$). Stream (111) contains mostly nitrogen, argon and a small amount of oxygen and minimal amounts of atmospheric impurities such as moisture and CO2. As previously mentioned, the PSA can be operated to produce $N_2$ at a range of purities from about 95% to 99.5% or more. It should be noted that residual argon, being inert is included as though it were nitrogen, as is common industry practice. The dew point of the $N_2$ product is nominally −70° F. Stream (111) may be further compressed in a product booster compressor, heated for example in a "hyperheater", cooled in chiller, or further purified of oxygen in a purifier to produce conditioned $N_2$ PSA product stream (121), having a first specification/composition—(shown as "spec 1"). The group of aforementioned unit operations termed mobile product conditioning (120) and are optional.

In parallel, liquid $N_2$ (201) is fed from liquid $N_2$ (LN2) transport unit/vessel (200) to the TMPU or TMVU (210). LIN transports are switched out for full transport vessels when empty and then driven to a liquid $N_2$ plant for refilling. The TMPU or TMVU, increases the pressure of the liquid $N_2$ and can also heat the liquid $N_2$ to vaporize it and heat it. The TMPU/TMVU produces stream (211) having a second specification/composition—(shown as "spec 2"), that is added to stream (121) to form mixed $N_2$ product stream (301) having a third specification/composition—(shown as "spec 3"). This product stream may have the same or different specification/composition depending on the composition of streams (121) and (211). The point of addition of streams (121) and (211) may be a simple T or Y union or manifold, and include a static mixing device if desired to enhance mixing of the two streams to form a uniformly mixed $N_2$ product stream (301). Although not shown, check valves are typically used to prevent backflow of $N_2$ gas into either feed stream as well as isolation valves. Flow meters, pressure gages, thermocouples and purity analyzers may also be included as desired in streams (121), (211) and (301) to quantify and assure that the requisite specifications/compositions for these streams are met. Stream (301) is supplied to the customer for a specific $N_2$ application (300) such that the combination of streams (121) and (211) meet or exceed the specification/composition of the customer specification. As described and shown in FIG. 1, all the components of the $N_2$ service supply system are mobile or portable to various customer locations. The PSA will provide baseload $N_2$ and supplemental nitrogen will be provided by the Liquid $N_2$-fed TMPU/TMVU. The pressure requirement of the customer would be met independently by both the mobile $N_2$ PSA with optional product compressor, and the LIN-fed supply system. The temperature and purity specification of stream (301) is a weighted average of stream (121) and (211).

In an exemplary embodiment at least one mobile $N_2$ PSA unit (110) supplies the base load $N_2$ for the industrial service, coupled with at least one liquid $N_2$-fed TMPU or TMVU (210) to provide supplemental $N_2$ stream (211) for the industrial service (300). The at least one mobile PSA provides low cost $N_2$, whilst the at least one TMPU or TMVU (210) makes up any shortfall in demand, albeit at a higher unit cost for the incremental $N_2$. The average cost of the entire $N_2$ supplied for the service is still lower than that from an all liquid source (200), and is lower than an all PSA source (110) where at least one of the PSAs is significantly underutilized. In this embodiment, both the at least one PSA unit (110) and the at least one liquid $N_2$-fed source (200/210), each supply $N_2$ at the required pressure, temperature and purities of the service application, the products from each being additive to meet the required capacity.

In another exemplary embodiment, one or more of the at least one PSA units (110), may be operated at a lower purity than that required by the service application to increase PSA capacity. In this case, supplemental $N_2$ from the at least one liquid N2-fed source (200/210) brings the combined supply back to the required purity specification upon addition.

In another variant of the embodiment, one or more of the at least one PSA units (110) produces $N_2$ at a temperature above the temperature requirement of the service application. Supplemental $N_2$ from the at least one liquid $N_2$-fed source (200/210) is supplied below the temperature required by the service application, such when the two supplies are combined into stream (301), this stream meets the flow specification and the temperature specification of the specific service application.

In another exemplary embodiment, one or more of the at least one PSA units (110) produces $N_2$ at a temperature below the temperature requirement of the service application. Supplemental N2 from the at least one liquid N2-fed source (200/210) is supplied above that required by the service application such when the two supplies are combined into stream (301), the latter meets the flow and temperature specification of the service application.

In another embodiment, at least one mobile product conditioning/processing module (120) is provided after each of the at least one PSA units (110) in order to raise the pressure (a booster compressor), raise the temperature (a "hyperheater"/mobile heater), lower the temperature (a chiller), or increase the purity (a deoxo purifier). In this embodiment, both the at least one PSA unit (110) with at least one product conditioner (120), and the at least one liquid $N_2$-fed source (200/210) each supply the $N_2$ at the required pressure, temperature and purities of the service application, the product from each being additive in capacity.

The invention is further explained through the following examples, which are not to be construed as limiting the present invention.

Example 1

A process unit to be dried requires, 200 kscfh of $N_2$ at 100 psig, 100° F., and 95% purity for 15 days. The selected solution is to provide one mobile $N_2$ PSA supplying $N_2$ at 135 kscfh, 100 psig, 100° F. and 95% purity, plus one liquid $N_2$-fed TMPU or TMVU supplying 65 kscfh $N_2$ gas at 100 psig, 100° F. and approximately 99.999% purity. In this case both sub-systems supply $N_2$ gas at approximately the required pressure and temperature. The combined flow is 200 kscfh of $N_2$ at a purity of approximately 96.6%, thus meeting the flow, pressure and temperature requirements and exceeding the purity requirement of the application. Over the course of 15 days, the drying application consumes 72 MMscf of $N_2$ gas, of which 49 MMscf is supplied by the PSA and 23 MMscf from liquid $N_2$. The application, thus, requires 46 liquid $N_2$ transport vessels to be delivered over the 15 days, compared to 144 transport vessels if the application were to be serviced with only liquid $N_2$ and no $N_2$ PSA.

In this same drying example, if the required $N_2$ purity for the application were to be increased from 95% to approximately 99.5%, one solution is to run the PSA at 99% purity, whereupon $N_2$ recovery is reduced and the PSA capacity falls to 100 kscfh, compared to a PSA operating at 95% purity yielding 135 kscfh as in the above example. 100 kscfh of supplemental $N_2$ is provided from the LIN-fed source at 99.999% purity. The combined flow is 200 kscfh of $N_2$ at a purity of approximately 99.5%, thus meeting the flow, pressure and temperature and purity requirements of the application. Over the course of 15 days, the application consumes 72 MMscf of $N_2$ gas, with 36 MMscf supplied both by the PSA and from liquid $N_2$. The application requires 72 liquid $N_2$ transports to be delivered over the 15 days, compared to 144 transports if the application were to be serviced with only liquid $N_2$ and no $N_2$ PSA. Another possibility would be the use of stand-alone PSA units only. However, to achieve the flow and purity requirements, it would require 3 such PSA units delivering approximately 67 kscfh each at 99.5% purity. Therefore, on one hand, the proposed solution of one PSA mitigates 72 liquid transports, on the other the use supplemental liquid $N_2$ mitigates the need for two mobile PSAs.

Example 2

A vessel to be heated, requires 200 kscfh of $N_2$ at 150 psig, 250° F., and 95% purity for 5 days. The selected solution is to provide one mobile $N_2$ PSA supplying $N_2$ at 135 kscfh, 100 F and 95% purity, with a booster compressor to raise the pressure to at least 150 psig, plus one TMPU supplying 65 kscfh N2 at 150 psig, and approximately 562° F. and 99.999% purity. The combined flow is 200 kscfh of $N_2$ at a purity of approximately 96.6%, a pressure of 150 psig and a temperature of 400° F., thus meeting the flow, pressure and temperature requirements and exceeding the purity requirement of the heating application. In this case all the required heat is provided by the TMPU and no additional heat is required to be added to the PSA product. Over the course of 5 days, the job consumes 24 MMscf of $N_2$ gas, of which 16.2 MMscf is supplied by the PSA and 7.8 MMscf from liquid $N_2$. The application requires 16 liquid $N_2$ transports to be delivered over the 5 days, compared to 48 transports if the job were to be serviced with only liquid $N_2$ and no $N_2$ PSA.

Example 3

A reactor to be cooled by once-through cooling, requires 150 kscfh of $N_2$ at 150 psig, 50 F, and 99% purity for 1 day. The selected solution is to provide one mobile $N_2$ PSA supplying $N_2$ at 100 kscfh, 100 F and 99% purity, with a booster compressor to raise the pressure to at least 150 psig, plus one TMVU supplying 50 kscfh $N_2$ at 150 psig, and approximately −50° F. and 99.999% purity. The combined flow is 150 kscfh of $N_2$ at a purity of approximately 99.3%, a pressure of 150 psig and a temperature of 50° F., thus meeting the flow, pressure and temperature requirements and exceeding the purity requirement. In this case all the required cooling is provided by liquid $N_2$-fed TMVU and no additional cooling is required to be added to the PSA product. Over the course of 1 day, the job consumes 3.6 MMscf of $N_2$ gas, of which 2.4 MMscf is supplied by the PSA and 1.2 MMscf from liquid $N_2$. The application requires 3 liquid $N_2$ transports to be delivered over the 1 day, compared to 8 transports if the job were to be serviced with only liquid $N_2$ and no $N_2$ PSA.

It is thus demonstrated that a mobile $N_2$ PSA supply system and mobile liquid $N_2$ fed supply system can be combined to meet the flow, pressure, temperature and purity requirements of a variety of $N_2$ service applications, whilst lowering the amount of nitrogen to be supplied from a liquid source and via transports. The pressure of the $N_2$ from the PSA can be increased if required through the use of a booster compressor. Further, $N_2$ supply temperatures above or below that of a $N_2$ PSA can be achieved through integration with the liquid $N_2$ fed supply system. Still further, higher purity $N_2$ supply can be achieved from the integrated system, than can be efficiently provided by the PSA alone.

Although various embodiments have been shown and described, the present disclosure is not so limited and will be understood to include all such modifications and variations as would be apparent to one skilled in the art.

We claim:

1. An integrated system for providing nitrogen to a temporary industrial service application, comprising:
   at least one mobile pressure swing adsorption unit for providing a baseload of nitrogen fluid having a first specification to a nitrogen service application;
   at least one mobile liquid $N_2$ fed system including liquid $N_2$ transports/trailers disposed upstream of at least one trailer mounted pumper unit or trailer mounted vaporizer unit liquid $N_2$ feed system to provide liquid nitrogen thereto for providing supplemental nitrogen at a second specification to the nitrogen service application, wherein a combined baseload and supplemental nitrogen provide a product nitrogen stream at a predetermined flow rate, temperature, pressure, and purity as required by the industrial service application.

2. The integrated system of claim 1, further comprising: at least one mobile air compressor disposed upstream of the at least one pressure swing adsorption apparatus for receiving an air feed stream, to form a compressed air stream and feeding the compressed air stream to the at least one pressure swing adsorption apparatus.

3. The integrated system of claim 1, further comprising: a mobile product conditioning unit for receiving a product stream from the at least one pressure swing adsorption unit to manipulate the pressure, temperature or purity of the baseload nitrogen fluid.

4. The integrated system of claim 1, further comprising a mixing device downstream for combining the baseload of nitrogen fluid having a first specification with the supplemental nitrogen having a second specification to form a product stream of the requisite nitrogen specifications necessitated by the service application.

5. An integrated process for providing nitrogen to a temporary industrial service application, comprising:
   providing a compressed feed stream to at least one mobile nitrogen pressure swing adsorption unit and separating a baseload of nitrogen fluid having a first specification from an oxygen enriched waste steam;
   providing a supplemental nitrogen via a liquid $N_2$ fed system including liquid $N_2$ transports/trailers disposed upstream of at least one trailer mounted pumper unit or trailer mounted vaporizer unit liquid $N_2$ feed system to provide liquid nitrogen thereto wherein the supplemental nitrogen is provided at a second specification, and combining the supplemental nitrogen with a baseload nitrogen fluid producing a product nitrogen stream at a predetermined flow rate, temperature, pressure and purity as required by the industrial service application.

6. The integrated process of claim 5, wherein the product nitrogen is provided at a flow rate ranging from about 20 ksch to 1,000 ksch and a purity from approximately 90% to 99.9%.

7. The integrated process of claim 5, wherein the temporary industrial service application is selected from: process unit drying, transmission pipeline drying/purging, catalyst replacement, reactor cooling, storage tank cooling/purging, transmission pipeline displacement, pipeline target testing and mine inerting.

8. The integrated process of claim 5, wherein the product nitrogen is provided pressure ranging from about 50-500 psig, a temperature of −250 to 320° F., and a duration of 1-90 days.

9. An integrated process for providing nitrogen to a temporary heating service application, comprising:
   providing a compressed air feed stream to at least one mobile nitrogen pressure swing adsorption unit and separating a baseload of nitrogen fluid having a first specification from an oxygen enriched waste steam and where said baseload nitrogen fluid is at a lower temperature than required by the heating application;
   providing a supplemental nitrogen via a liquid $N_2$ fed system wherein the supplemental nitrogen is provided at a second specification and where the supplemental nitrogen is at a higher temperature than required by the heating application, and combining the supplemental nitrogen with the baseload nitrogen fluid producing a product nitrogen stream at a predetermined flow rate, temperature, pressure and purity as required by the heating service application.

10. The integrated system of claim 1, further comprising an advanced PLC system that manipulates the PSA and liquid $N_2$ fed system independently to attain a product nitrogen stream based on the process parameters required by the downstream application.

11. An integrated process for providing nitrogen to a temporary cooling service application, comprising:
   providing a compressed air feed stream to at least one mobile nitrogen pressure swing adsorption unit and separating a baseload of nitrogen fluid having a first specification from an oxygen enriched waste steam and where said baseload nitrogen fluid is at a higher temperature than required by the cooling application;
   providing a supplemental nitrogen via a liquid $N_2$ fed system wherein the supplemental nitrogen is provided at a second specification and where the supplemental nitrogen is at a lower temperature than required by the cooling application and combining the supplemental nitrogen with the baseload nitrogen fluid producing a product nitrogen stream at a predetermined flow rate, temperature, pressure and purity as required by the cooling service application.

12. An integrated process for providing nitrogen to a temporary industrial service application, comprising:
   providing a compressed air feed stream to at least one mobile nitrogen pressure swing adsorption unit and separating a baseload of nitrogen fluid having a first specification from an oxygen enriched waste steam and where said baseload nitrogen fluid is at a lower purity than required by the service application;
   providing a supplemental nitrogen via a liquid $N_2$ fed system wherein the supplemental nitrogen is provided at a second specification and where the supplemental nitrogen is at a higher purity than required by the service application and combining the supplemental nitrogen with the baseload nitrogen fluid producing a product nitrogen stream at a predetermined flow rate, temperature, pressure and purity as required by the service application.

* * * * *